United States Patent
Trayer et al.

(10) Patent No.: US 8,285,797 B2
(45) Date of Patent: Oct. 9, 2012

(54) TECHNIQUE FOR CONTROLLING DEVICE MANAGEMENT RESPONSE MESSAGES

(75) Inventors: Mark Trayer, Plano, TX (US); Kong Posh Bhat, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 12/652,729

(22) Filed: Jan. 5, 2010

(65) Prior Publication Data

US 2011/0022667 A1 Jan. 27, 2011

Related U.S. Application Data

(60) Provisional application No. 61/228,317, filed on Jul. 24, 2009.

(51) Int. Cl.
  *G06F 15/16* (2006.01)
  *H04M 3/00* (2006.01)
  *H04L 12/56* (2006.01)

(52) U.S. Cl. .......... 709/206; 455/418; 370/401

(58) Field of Classification Search .......... 709/206; 455/418; 370/401
  See application file for complete search history.

(56) References Cited

U.S. PATENT DOCUMENTS

| | | | |
|---|---|---|---|
| 7,444,133 B1 * | 10/2008 | McNamara et al. | 455/411 |
| 7,747,722 B2 * | 6/2010 | Kim | 709/223 |
| 7,844,964 B2 * | 11/2010 | Marolia | 717/172 |
| 8,005,468 B2 * | 8/2011 | Marolia et al. | 455/418 |
| 2002/0147912 A1 * | 10/2002 | Shmueli et al. | 713/182 |
| 2007/0093243 A1 * | 4/2007 | Kapadekar et al. | 455/419 |
| 2007/0124439 A1 * | 5/2007 | Shah et al. | 709/223 |
| 2007/0174462 A1 | 7/2007 | Kim et al. | |
| 2008/0046583 A1 * | 2/2008 | Rao | 709/230 |
| 2009/0019104 A1 * | 1/2009 | Justen et al. | 709/202 |
| 2009/0199176 A1 * | 8/2009 | Nath et al. | 717/178 |
| 2009/0204667 A1 * | 8/2009 | Diaz et al. | 709/203 |
| 2009/0239555 A1 * | 9/2009 | Sim et al. | 455/458 |

FOREIGN PATENT DOCUMENTS

WO   2007/064167 A1   6/2007

OTHER PUBLICATIONS

Universal Mobile Telecommunication System (UMTS); LTE; IP Multimedia Subsystem (IMS); Multimedia Telephony; Media Handling and Interaction (3GPP TS 26.114 version 8.3.0 Release 8), ETSI TS 126 114, Jun. 2009, France.

* cited by examiner

*Primary Examiner* — Asghar Bilgrami
(74) *Attorney, Agent, or Firm* — Jefferson IP Law, LLP

(57) ABSTRACT

A device for use in a communication system and a method for its operation are provided. The method of operating a Device Management (DM) client of a device in a communication system includes receiving an out-of-band DM message from a DM server, determining if out-of-band message response (OOBMsgResponse) reporting is inhibited based on an OOBMsgResponse node in a Management Object (MO), and if it is determined that OOBMsgResponse reporting is not inhibited, sending a response message in response to the out-of-band DM message received from the DM server.

51 Claims, 9 Drawing Sheets

TECHNIQUE FOR CONTROLLING DEVICE MANAGEMENT RESPONSE MESSAGES

CROSS-REFERENCE TO RELATED APPLICATIONS

This application claims the benefit under 35 U.S.C. §119 (e) of a U.S. Provisional application filed on Jul. 24, 2009 in the U.S. Patent and Trademark Office and assigned Ser. No. 61/228,317, the entire disclosure of which is hereby incorporated by reference.

BACKGROUND OF THE INVENTION

1. Field of the Invention

The present invention relates to Device Management (DM) messaging in a communication system. More particularly, the present invention relates to a technique for controlling DM response messages in a communication system.

2. Description of the Related Art

With the growth in ubiquitous communications technologies and systems, devices are increasing in functionality and complexity. However, with the increase in the functionality and complexity of the devices, a need for the management of the devices has developed. To address that need, the Open Mobile Alliance (OMA) established a Device Management (DM) Working Group to specify protocols and mechanisms that achieve management of devices. The OMA DM Working Group has developed the OMA-DM specification, which defines a two-way protocol between a DM server and a DM client associated with a device that is used for remote management of the device. An instance of an association between a DM Sever and a DM Client is referred to as a DM session and may be initiated by either the DM client or the DM server. The DM client resides in the device and the DM server manages the device by invoking commands on the DM client. The DM client processes the command and sends a response back to the DM server. Communication between the server and the client is over Synchronization Markup Language (SyncML). Historically, the devices have been wireless devices, but of late, OMA-DM has begun addressing the remote management needs of wired devices as well. Examples of OMA-DM include the setting of initial configuration information in devices, the subsequent installation and update of persistent information in devices, the retrieval of management information from devices, and the processing of events and alarms generated by devices.

An example of the OMA-DM architecture is described below with reference to FIG. 1.

FIG. 1 illustrates an OMA-DM architecture according to the related art.

Referring to FIG. 1, the OMA-DM architecture includes a DM server 100, a DM client 110 and DM standard Management Objects (MOs) 120. The OMA-DM architecture may include additional structural elements. However, a description of additional structural elements of the OMA-DM architecture is omitted for conciseness.

The DM server 100 and DM client 110, which have been described above, communicate via interfaces DM-1 130 and DM-2 132. DM client 110 communicates via interface DM-5 134 with the DM Standard Objects 120.

The DM protocol defines three standard Management Objects (MOs) 120 that all implementations of a DM Client 110 must support. These DM standard MOs 120 include DM Account (DMAcc) MO 122, Device Information (DevInfo) MO 124 and Device Details (DevDetail) MO 126.

The DMAcc MO 122 is used to manage information pertaining to bootstrapped DM servers 100. For each DM server 100 that has been successfully bootstrapped for DM device 110, the DMAcc MO 122 maintains information on a DM Server Identifier (ID), connectivity information, server address, server and client credentials, etc. The DevInfo MO 124 provides basic information about a device associated with the DM client 110. The basic information includes a device ID, a device manufacturer ID, a model identifier, and language settings. The DevDetail MO 126 provides additional information about the device associated with the DM client 110. The additional information includes device type, Original Equipment Manufacturer (OEM), hardware version, firmware version, software version, an indication of whether the device supports optional features (e.g. large-object handling capability), maximum depth of the management tree, maximum total length of any Uniform Resource ID (URI), and maximum total length of any URI segment.

An example of a communication system employing OMA-DM is described below with reference to FIG. 2.

FIG. 2 illustrates an exemplary communication system employing OMA-DM according to the related art.

Referring to FIG. 2, the exemplary communication system employing OMA-DM may include a wired network 200, a wireless network 202, a wired device 210, a wireless device 212, a DM server 220, and a DM authority 230. Each of the wired device 210 and the wireless device 212 has associated therewith a DM client (not shown). In addition, the DM authority 230 may be an Operations Support System (OSS). In FIG. 2, solid lines represent physical connectivity and dotted lines represent logical connectivity.

The exemplary communication system employing OMA-DM illustrated in FIG. 2 is merely one of a number of possible implementations. For example, one of the wired network 200 and the wireless network 202 may be omitted. Alternatively, the wired network 200 and the wireless network 202 may be combined. Further, while the DM server 220 and the DM authority 230 are shown as connected to the wired network 200, one or both of the DM server 220 and the DM authority 230 may alternatively be connected to the wireless network 202.

To facilitate OMA-DM in the communication system illustrated in FIG. 2, a two-way protocol based on the OMA-DM specification is utilized between the DM server 220 and the DM client associated with wireless device 212, and between the DM server 220 and the DM client associated with the wired device 210. The DM authority 230 may direct the DM operations of the DM client associated with each of the wired device 210 and wireless device 212 via the DM server 220. Only the interaction between the DM server 220 and a DM client associated with each of the wired device 210 and wireless device 212, is within the scope of the OMA-DM specification.

An example of a DM server initiated DM session with a DM client is described below with reference to FIG. 3.

FIG. 3 is a signal diagram for a DM server initiated DM session with a DM client in a communication system according to the related art.

Referring to FIG. 3, the DM server initiated DM session between the DM server 302 and the DM client 304 includes two phases. The first phase is a setup phase 310 and the second phase is a management phase 320. The setup phase 310 includes an exchange of information for authentication and device information. The exchange of information in the setup phase 310 includes three packages, each of which may contain multiple messages, namely Package 0 (312), Package 1 (314), and Package 2 (316). Package 0 (312) is sent from DM server 302 to DM client 304 and includes alert information. Package 1 (314) is sent from DM client 304 to DM server 302. Package 1 (314) includes client initialization information and device information. The client initialization information includes client credentials. Package 2 (316) is sent from DM server 302 to DM client 304. Package 2 (316) includes server initialization information and an initial management operation. The server initialization information includes one or more server credentials.

The management phase 320 includes the exchange of two packages, namely Package 3 (322), and Package 4 (324). Package 3 (322) is sent from DM client 304 to DM server 302. Package 3 (322) includes client response information to the management operation triggered by Package 2 (316). Package 4 (324) is sent from DM server 302 to DM client 304. Package 4 (324) includes at least one of an additional management operation and one or more additional user interaction commands, if the DM session is continued beyond the Package 2 message 316. Additional cycles of a Package 3 message 322 and a Package 4 message 324 may be transmitted between the DM server 302 and DM client 304 until the DM session is terminated.

However, the DM server initiated DM session described above with reference to FIG. 3 was developed under the OMA-DM specification in the context of session oriented management operations via unicast communication. Recently, the OMA, under the aegis of the DM-BroadCAST (BCAST) Birds-of-a-Feather (BoF) interest group, started looking at non-session oriented management operations that enable a trusted DM server to push DM commands to a DM device, without the overhead of establishing and maintaining a session. Such DM commands may hereafter be referred to as out-of-band DM messages or session-less messages.

One technique to push out-of-band DM commands to a DM device, without the overhead of establishing and maintaining a session, is to simultaneously execute DM commands in a broadcast mode on a large number of devices. An exemplary communication system employing DM-BCAST is similar to the communication system described above with reference to FIG. 2. However, a communication system employing DM-BCAST includes a BCAST server (not shown). In operation, an out-of-band DM command to be communicated via BCAST originates at the DM server, is transmitted to a BCAST server, and is then transmitted to a plurality of devices. While this feature can be made use of by any service provider that chooses to use it, the DM-BCAST BoF study group identified specific cases where this capability has certain utility. Such identified use cases include firmware/software updates, audience/network measurements, and device capability control.

The DM protocol has been designed so that a DM client reports back the response/status of any DM command issued by a DM server. However, the DM protocol does not support any mechanism to control the flow of messages from the DM client to the DM server. This is problematic in the broadcast setting as there is a need to regulate the flow of response/status messages back from the DM client to the DM server so as not to overwhelm the DM server with response messages.

An example of a flow of messages from a DM server to DM clients in a broadcast setting are described below with reference to FIG. 4.

FIG. 4 illustrates a flow of messages from a DM server to DM clients in a broadcast setting according to the related art.

Referring to FIG. 4, a DM Request R 400 is sent from DM Server 410 to a BCAST Server 420 for delivery to DM client 1 430-1, DM client 2 430-2 . . . DM Client n 430-n. The DM Request R 400 is sent from BCAST Server 420 to each of DM client 1 430-1, DM client 2 430-2 . . . DM Client n 430-n.

However, the responses from each of DM client 1 430-1, DM client 2 430-2 . . . DM Client n 430-n to DM Request R 400 are sent immediately. Further the responses from each of DM client 1 430-1, DM client 2 430-2 . . . DM Client n 430-n to DM Request R 400 are sent to either a single designated response server (denoted by the RespURI element in the SyncML message) or sent directly to DM Server 410 if no RespURI element is present. The responses from each of DM client 1 430-1, DM client 2 430-2 . . . DM Client n 430-n to DM Request R 400 may not follow the path of DM Request R 400 through the BCAST Server 420.

As a result the DM Server 410 or designated single response server will receive a significant number of effectively simultaneous response messages from a DM Request R 400 from an unknown number of clients.

Therefore, a need exists for an architecture that provides scale-able response handling as well as a mechanism by which the generation of response/status messages from DM clients to a DM server can be controlled.

SUMMARY OF THE INVENTION

An aspect of the present invention is to address at least the above-mentioned problems and/or disadvantages and to provide at least the advantages described below. Accordingly, an aspect of the present invention is to provide a technique for controlling Device Management (DM) response messages in a communication system.

In accordance with an aspect of the present invention, a method for operating a DM client of a device in a communication system is provided. The method includes receiving an out-of-band DM message from a DM server, determining if out-of-band message response (OOBMsgResponse) reporting is inhibited based on an OOBMsgResponse node in a Management Object (MO), and if it is determined that OOBMsgResponse reporting is not inhibited, sending a response message in response to the out-of-band DM message received from the DM server.

In accordance with another aspect of the present invention, a device for use in a communication system is provided. The device includes a memory for storing code of a DM client, a processor for executing the code of the DM client stored in the memory, a communications unit for receiving and sending messages for the DM client, and the DM client. The DM client receives an out-of-band DM message from a DM server, determines if OOBMsgResponse reporting is inhibited based on an OOBMsgResponse node in a MO, and if it is determined that OOBMsgResponse reporting is not inhibited, sends a response message in response to the out-of-band DM message received from the DM server.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
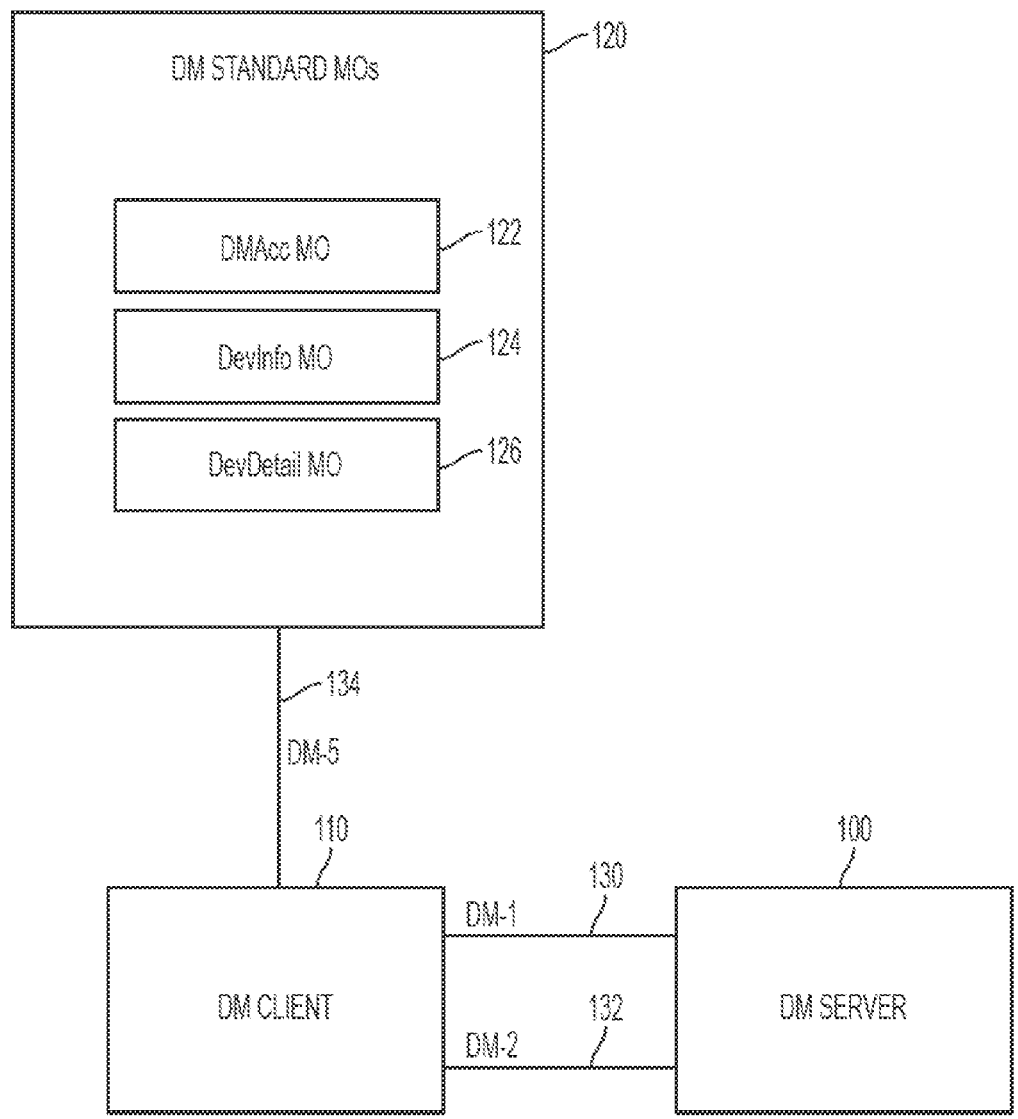
FIG. 1 illustrates an Open Mobile Alliance (OMA)-Device Management (DM) architecture according to the related art.
Figure 2:
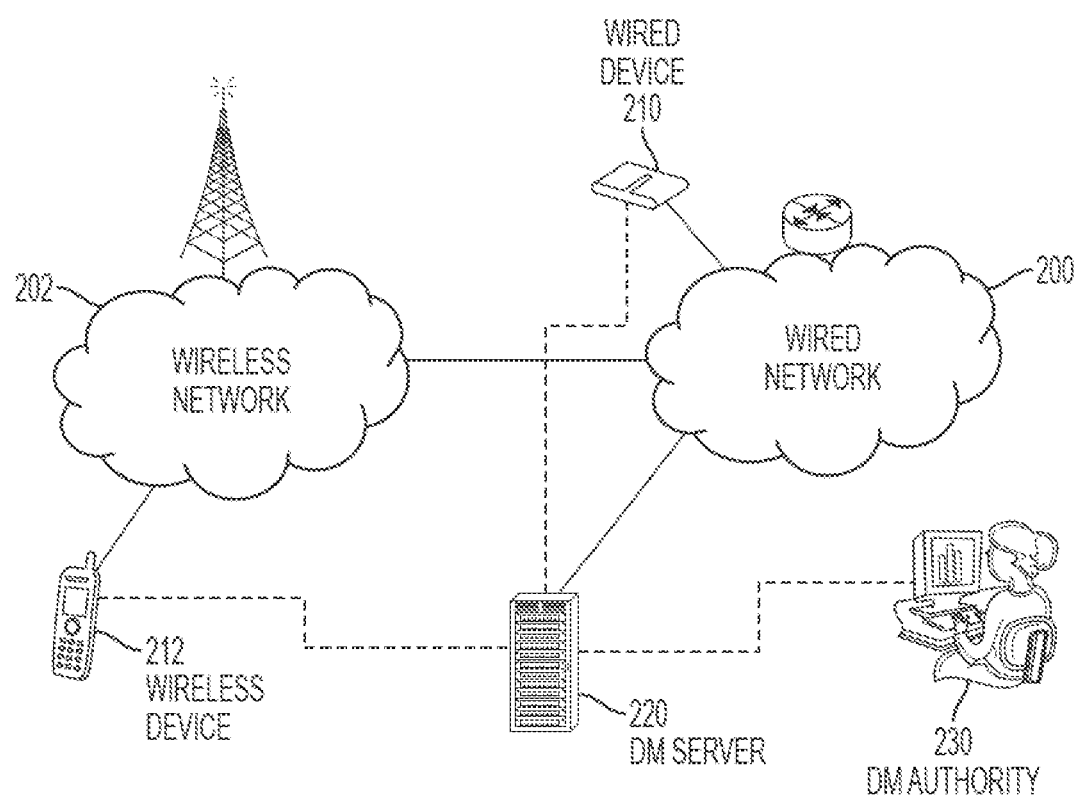
FIG. 2 illustrates an exemplary communication system employing OMA-DM according to the related art.
Figure 3:
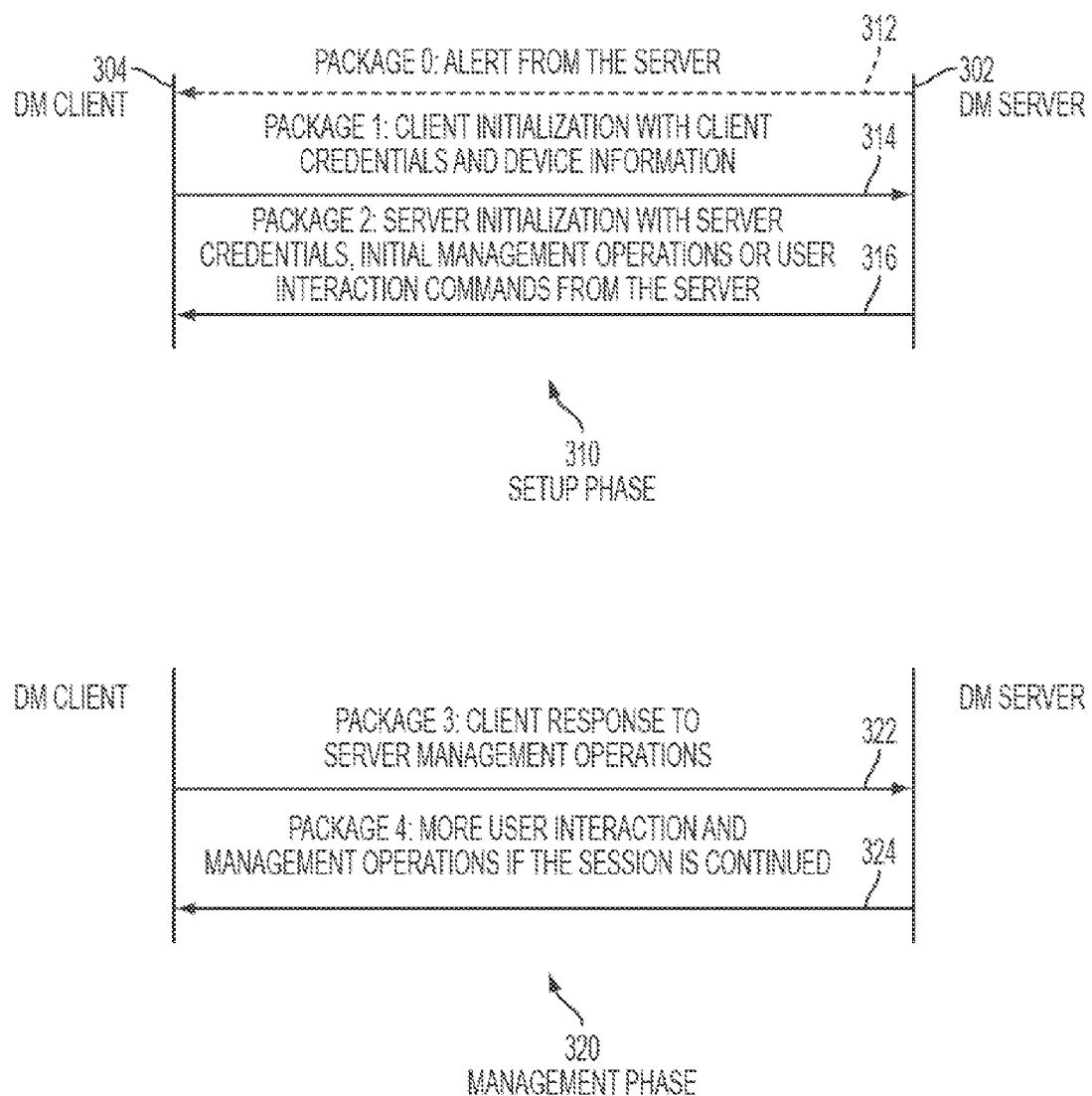
FIG. 3 is a signal diagram for a DM server initiated DM session with a DM client in a communication system according to the related art.
Figure 4:
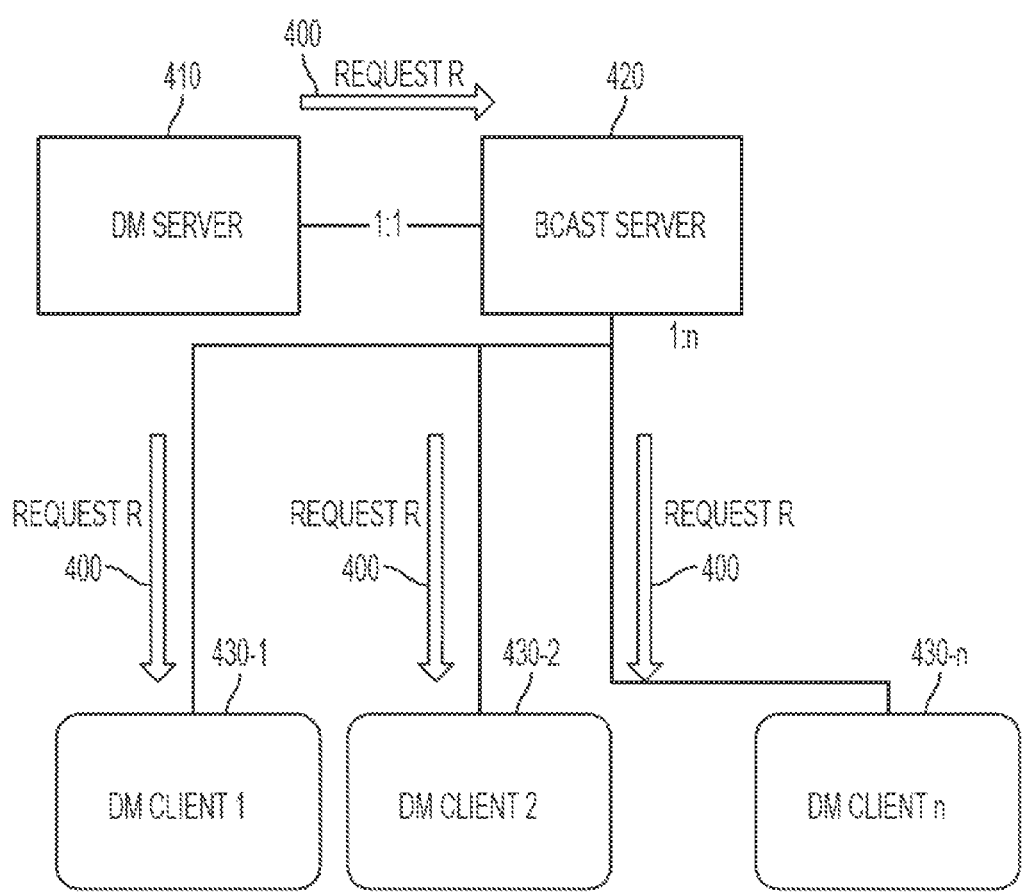
FIG. 4 illustrates a flow of messages from a DM server to DM clients in a broadcast setting according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention described below relate to a technique for controlling Device Management (DM) response messages in a communication system. More particularly, exemplary embodiments of the present invention described below relate to a technique for controlling a DM response message by a DM client to out-of-band DM messages received from a DM server. While the technique for controlling DM response messages in a communication system is described below in the context of Open Mobile Alliance (OMA)-DM response messages, the present invention is similarly applicable to the control of other messages. Further, while the technique for controlling DM response messages in a communication system is described hereafter in the context of broadcast, such as OMA-BroadCAST (BCAST), the present invention is similarly applicable in a non-broadcast scenario, such as unicast.

It should be understood that the following description may refer to terms utilized in various standards merely for simplicity of explanation. For example, the following description may refer to terms utilized in one of the OMA standards, such as the OMA-DM or OMA-BCAST standards. However, this description should not be interpreted as being limited to such standards. Independent of the mechanism used to control DM response messages in a communication system, it is preferable that DM response messages be controlled and it is advantageous for that ability to conform to a standardized mechanism.

Exemplary embodiments of the present invention control DM response messages in a communication system, and more specifically, OMA-DM response messages sent by a DM client in response to out-of-band DM messages received from a DM server. In addition, Exemplary embodiments of the present invention include a flexible scale-able architecture for the handling of OMA-DM response messages in a broadcast scenario as well as regulate the generation of response/status messages from a DM client back to a DM server.

A network architecture for controlling responses to out-of-band DM messages according to an exemplary embodiment of the present invention is described below with reference to FIG. 5.

Figure 5:
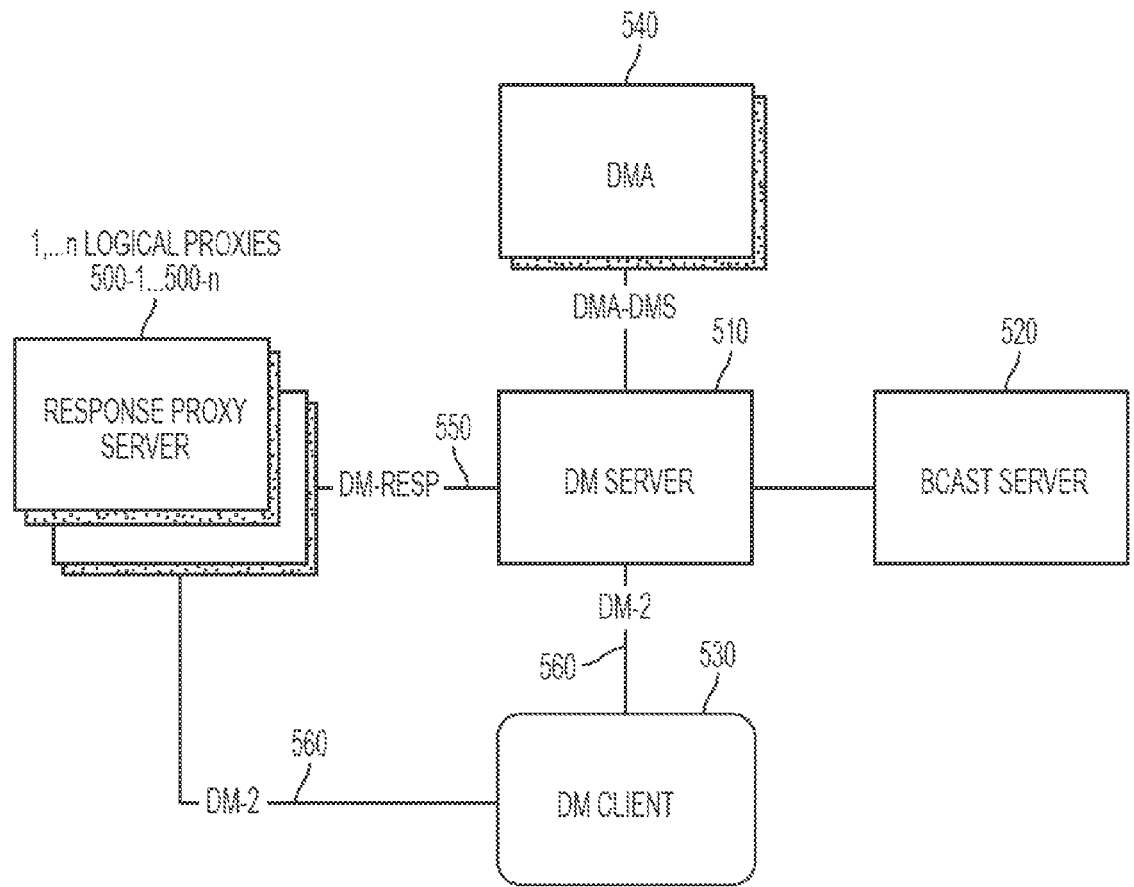
FIG. 5 illustrates a network architecture for controlling responses to out-of-band DM messages according to an exemplary embodiment of the present invention.

FIG. 5 illustrates a network architecture for controlling responses to out-of-band DM messages according to an exemplary embodiment of the present invention.

Referring to FIG. 5, the network architecture includes response proxy servers 500-1 to 500-*n*, DM server 510, BCAST server 520, DM client 530, and a DM Application (DMA) 540. The response proxy servers 500-1 to 500-*n* communicate with DM server 510 over a DM-Response (DM-Resp) interface 550. The DM client 530 communicates with DM server 510 over a DM-2 interface 560. The DM application 540 communicates with DM server 510 over a DMA-DM Server (DMA-DMS) interface 570.

Each DM client 530 is only aware of a single response proxy server of the response proxy servers 500-1 to 500-*n*. However, there may be 'n' response proxy servers 500-1 to 500-*n* per set of responses generated by a single broadcast request. The response proxy servers 500-1 to 500-*n* communicate with the DM server 510 over a DM-Resp interface.

The DMA 540 may communicate with the DM server 510 in order to trigger DM requests. However, the DMA 540 is unaware of the topology used to handle the response load triggered by the same requests.

The DM-Resp interface 550 is a new interface defined by an exemplary embodiment of the present invention, over which the DM server 510 and response proxy servers 500-1 to 500-*n* communicate to provide aggregated response data as potentially required by the DM server 510. In addition, information that is shared may include (but is not restricted to) session Identifiers (IDs) of a DM session.

In an exemplary embodiment of the present invention, the DM-Resp interface 550 may be realized via OMA DM Management Objects (MOs). More specifically, in an exemplary embodiment of the present invention, the DM-Resp interface 550 may be realized via OMA DM Account (DMAcc) MOs.

The OMA DMAcc MO includes the settings for a DM client associated with a device. The OMA DM standard specifies that OMA DM MOs be represented as a tree of named nodes. An example of the OMA DMAcc MO according to the related art is provided in FIG. 6.

Figure 6:
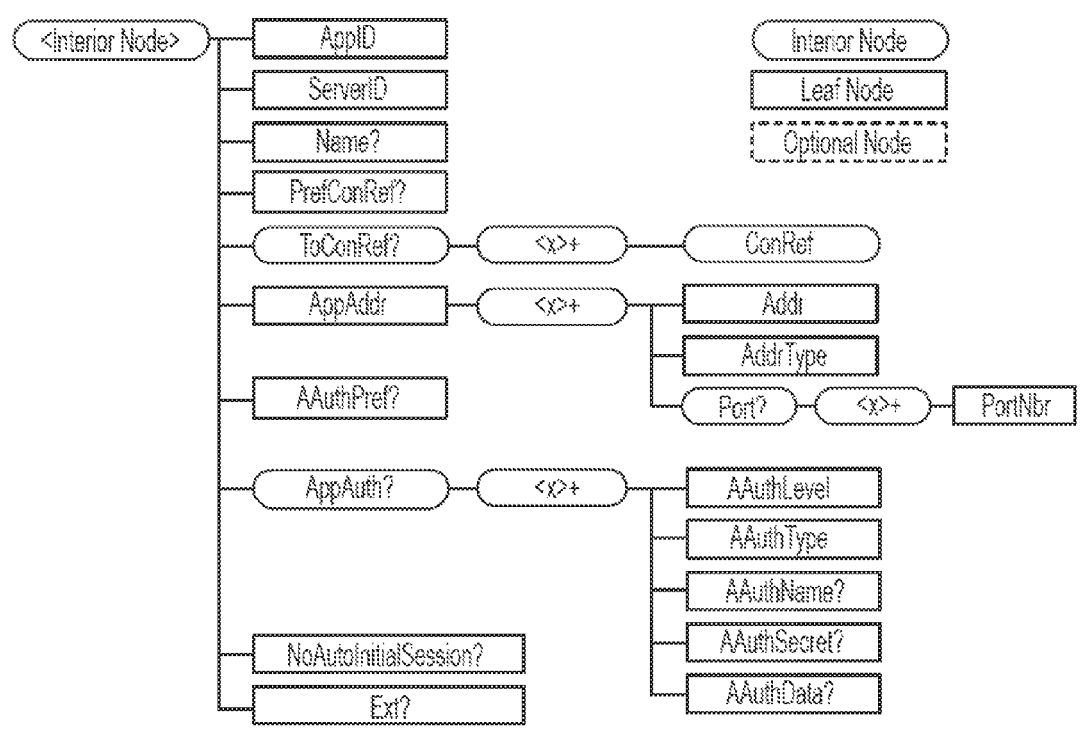
FIG. 6 illustrates a DM Account (DMAcc) Management Object (MO) according to the related art.

FIG. 6 illustrates a DMAcc MO according to the related art.

Referring to FIG. 6, a pictorial description of a tree of named nodes of a DMAcc MO of the related art is shown. The nodes depicted in FIG. 6 are outside the scope of the present invention and therefore a description of each node is omitted herein for conciseness. A description of each node depicted in FIG. 6 can be found in section 5.3.1 of version 1.2.1 of the OMA DM Standardized Objects, the entire disclosure of which is hereby incorporated by reference.

In an exemplary implementation of the DM-Resp interface via an OMA DMAcc MO, a plurality of new nodes are added to the DMAcc MO of the related art shown in FIG. 6. A DMAcc MO according to an exemplary embodiment of the present invention is described below with reference to FIG. 7

Figure 7:
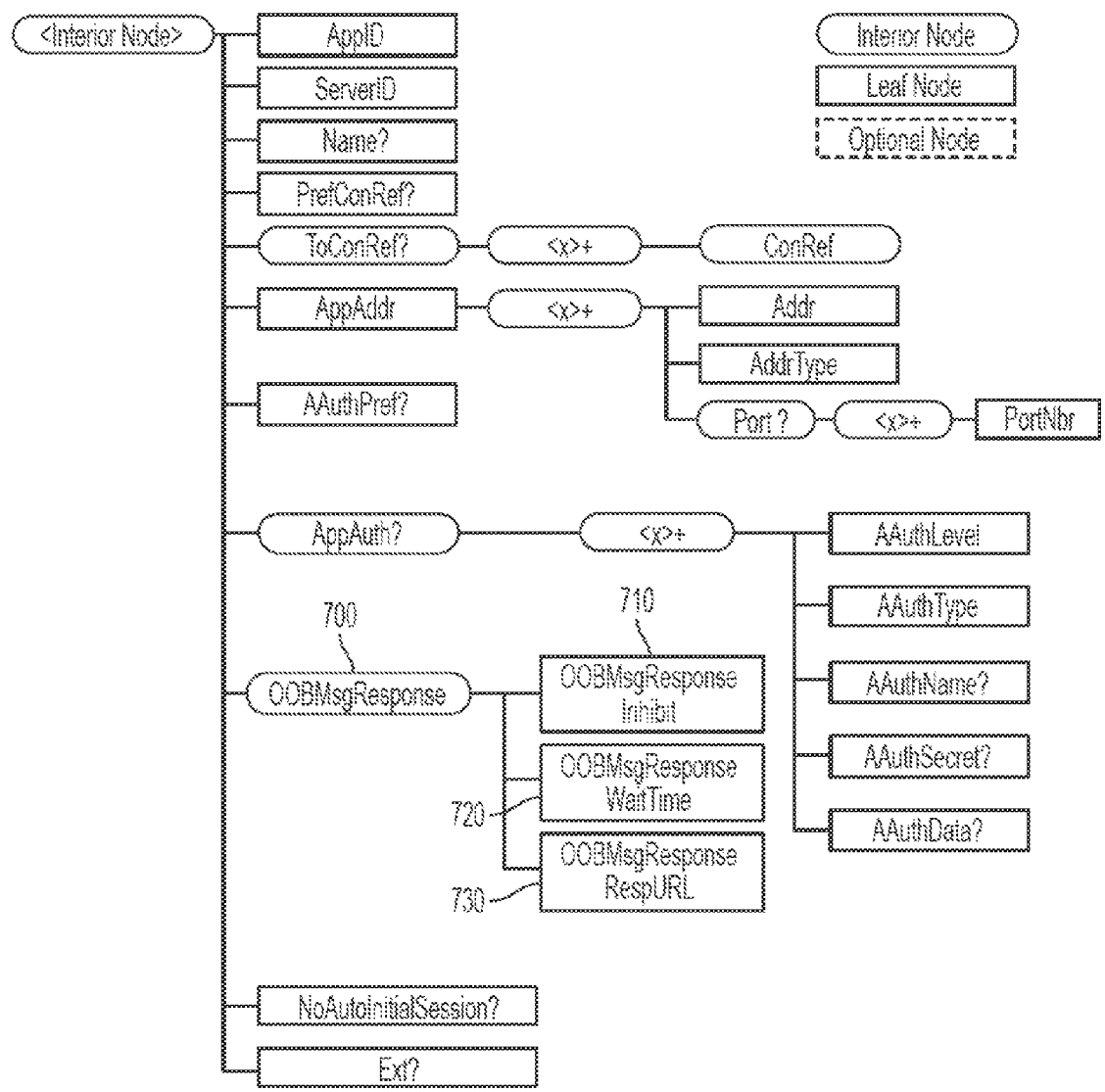
FIG. 7 illustrates a DMAcc MO according to an exemplary embodiment of the present invention.

FIG. 7 illustrates a DMAcc MO according to an exemplary embodiment of the present invention.

Referring to FIG. 7, the DMAcc MO includes a parent Out-Of-Band Message Response (OOBMsgResponse) node 700 and an Out-Of-Band Message Response Inhibit (OOBMsgResponseInhibit) node 710, an Out-Of-Band Message Response Wait Time (OOBMsgResponseWaitTime) node 720, and an Out-Of-Band Message Response Uniform Resource Locator (URL) (OOBMsgResponseRespURL) node 730, which has been added to the DMAcc MO of the related art. The specific node names (e.g., OOBMsgResponse) referred to herein are merely illustrative; it is the function of the respective node that corresponds to exemplary embodiments of the present invention. The other nodes depicted in FIG. 7 are the nodes of the DMAcc MO of the related art depicted in FIG. 6 and are outside the scope of the present invention. Therefore a description of each these nodes is omitted herein for conciseness.

The OOBMsgResponse node 700 may be added to the DMAcc MO of the related art as the parent node for each of the OOBMsgResponseInhibit node 710, the OOBMsgResponseWaitTime node 720, and the OOBMsgResponseRespURL node 730. The OOBMsgResponse node 700 is located in the DMAcc MO at Node: <x>/OOBMsgResponse. The OOBMsgResponse node 700 includes the properties shown in Table 1.

TABLE 1

| Status | Occurrence | Format | Minimum Access Types |
|---|---|---|---|
| Optional | ZeroOrOne | node | Get |

If the OOBMsgResponse node 700 is absent, no response will be sent by the DM device for out-of-band DM messages.

The OOBMsgResponseInhibit 710, may be added to the DMAcc MO of the related art to explicitly control (allow or inhibit) a response to an out-of-band DM Request message received by a DM Client. The OOBMsgResponseInhibit node is located in the DMAcc MO at Node: <x>/OOBMsgResponseInhibit. The OOBMsgResponseInhibit node includes the properties shown in Table 2.

TABLE 2

| Status | Occurrence | Format | Minimum Access Types |
|---|---|---|---|
| Required | One | boolean | Get, Replace |

The OOBMsgResponseInhibit node 710 indicates whether or not responses for out-of-band DM messages received from the associated DM Server are inhibited. If the value of OOBMsgResponseInhibit node 710 is true, no response will be sent for out-of-band DM messages.

The OOBMsgResponseWaitTime node 720 may be added to the DMAcc MO of the related art to provide the ability to specify a time delay interval after which the DM Client provides a response to the received out-of-band DM Request message. This allows responses to be staggered across Management Authority (MA) defined client groups, thereby equalizing a load on the system. The OOBMsgResponseWaitTime node 720 is located in the DMAcc MO at Node: <x>/OOBMsgResponseWaitTime. The OOBMsgResponseWaitTime node 720 includes the properties shown in Table 3.

TABLE 3

| Status | Occurrence | Format | Minimum Access Types |
|---|---|---|---|
| Optional | ZeroOrOne | int | Get, Replace |

The OOBMsgResponseWaitTime node 720 indicates the minimum amount of time, in seconds, that a DM Client should wait before sending out a response/status message to an out-of-band DM message. If this node is not present, the response message to an out-of-band DM message should be sent out immediately.

The OOBMsgResponseRespURL node 730 may be added to the DMAcc MO of the related art to provide the location of a response proxy server for the DM device. The OOBMsgResponseRespURL node 730 is located in the DMAcc MO at Node: <x>/OOBMsgResponseRespURL. The OOBMsgResponseRespURL node 730 includes the properties shown in Table 4.

TABLE 4

| Status | Occurrence | Format | Minimum Access Types |
|---|---|---|---|
| Optional | ZeroOrOne | chr | Get, Replace |

The OOBMsgResponseRespURL node 730 contains a URL of a response proxy server to which a response message should be sent. This value shall have precedence over the URL that may be indicated by a Response Uniform Resource ID (URI) (RespURI) element in a Synchronization Markup Language (SyncML) message header (SyncHdr) of the out-of-band DM message.

A method for controlling responses to out-of-band DM messages in a communication system according to an exemplary embodiment of the present invention will be described below with reference to FIG. 8.

Figure 8:
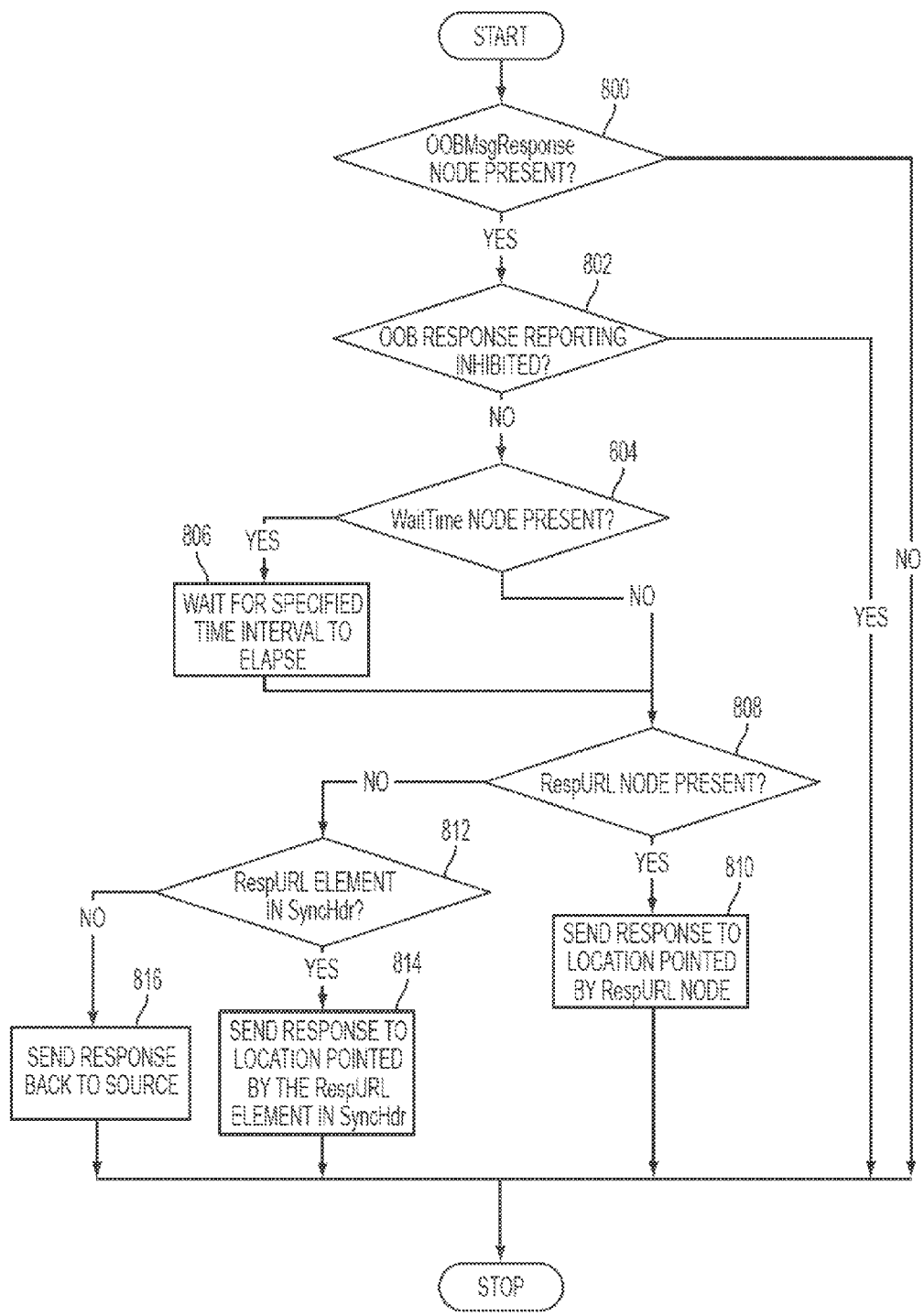
FIG. 8 is a flowchart illustrating a method for controlling responses to out-of-band DM messages in a communication system according to an exemplary embodiment of the present invention.

FIG. 8 is a flowchart illustrating a method for controlling responses to out-of-band DM messages in a communication system according to an exemplary embodiment of the present invention Referring to FIG. 8, in step 800, after an out-of-band DM message is received from a DM server, a DM client determines if an OOBMsgResponse node is present. If the DM client determines that the OOBMsgResponse node is not present at step 800, the DM client terminates the procedure and no response is sent. However, if the DM client determines that the OOBMsgResponse node is present at step 800, the DM client proceeds to step 802.

In step 802, the DM client determines if OOB response reporting is inhibited. The DM client determines if OOB response reporting is inhibited by checking the OOBMsgResponseInhibit node. If the DM client determines that OOB response reporting is inhibited at step 802, the DM client terminates the procedure and no response is sent. However, if the DM client determines that OOB response reporting is allowed, the DM client proceeds to step 804.

In step 804, the DM client determines if a OOBMsgResponseWaitTime node is present. If the DM client determines that the OOBMsgResponseWaitTime node is present, the DM client proceeds to step 806 and waits for a specified time interval to elapse before proceeding to step 808. However, if the DM client determines that the OOBMsgResponseWaitTime node is absent, the DM client proceeds to step 808.

In step 808, the DM client determines if the OOBMsgResponseRespURL node is present. If the DM client determines that the OOBMsgResponseRespURL node is present at step 808, the response is sent to the location indicated by the OOBMsgResponseRespURL node in step 810. Thereafter, the DM client ends the procedure. However, if the DM client determines that the OOBMsgResponseRespURL node is absent, the DM client proceeds to step 812.

In step 812, the DM client determines if a SyncHdr contains a RespURI element. The RespURI element is an optional element for the SyncML message header. If the DM client determines that the SyncML message header contains the RespURI element at step 812, the DM client sends a response to a location identified by the RespURI element in step 814. Thereafter, the DM client ends the procedure. However, if the DM client determines that the SyncML message header does not contain the RespURI element at step 812, the DM client sends the response back to the source that issued the out-of-band DM message. Thereafter, the DM client ends the procedure.

In an exemplary embodiment of the present invention, instead of adding new nodes to the DMAcc MO of the related art as described above, a new MO may be defined that includes the parent OOBMsgResponse node, the OOBMsgResponseInhibit node, the OOBMsgResponseWaitTime node, and the OOBMsgResponseRespURL node. In this exemplary embodiment of the present invention, the DMAcc MO may provide references to pertinent instances of the new MO.

A structure of a device including a DM client for controlling OMA-DM response messages in a communication system according to an exemplary embodiment of the present invention will be described below with reference to FIG. 9.

Figure 9:
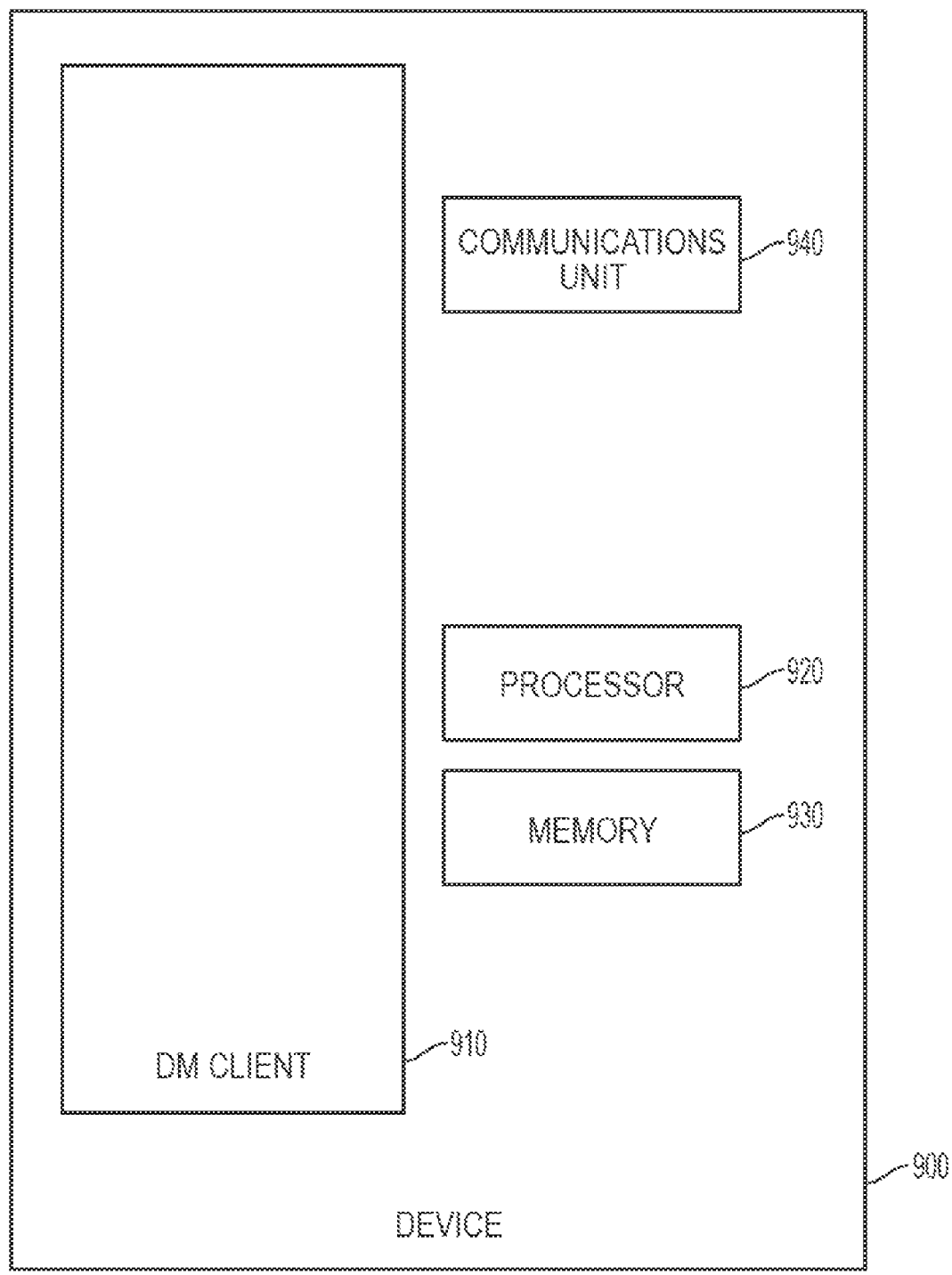
FIG. 9 is a block diagram of a device including a DM client for controlling responses to out-of-band DM messages in a communication system according to an exemplary embodiment of the present invention.

FIG. 9 is a block diagram of a device including a DM client for controlling responses to out-of-band DM messages in a communication system according to an exemplary embodiment of the present invention.

Referring to FIG. 9, the device 900 includes a DM client 910, a processor 920, a memory 930, and a communications unit 940. The device 900 may include any number of additional structural elements. However, a description of additional structural elements of device 900 is omitted for conciseness.

The DM client 910 may be implemented as code that is executed by the processor 920 or may be implemented as hardware. The term "code" may be used herein to represent one or more of executable instructions, operand data, configuration parameters, and other information stored in memory 930 of the device 900. The operations of the DM client 910 include any of the operations explicitly or implicitly described above as being performed by a DM client. For example, the DM client receives an out-of-band DM message from a DM server. In addition, the DM client determines if out-of-band message response reporting is inhibited based on an OOBMsgResponse node in an MO. Also, if the DM client determines that out-of-band message response reporting is not inhibited, the DM client sends a response message in response to the out-of-band DM message received from the DM server.

The processor 920 is used to process general operations of the device 900 and may be used to execute the code of the DM client 910.

The memory 930 may store the code of the DM client 910 in addition to one or more of executable instructions, operand data, configuration parameters, and other information stored of the device 900. Depending on the exact configuration and type of device, memory 930 may be volatile (such as Random Access Memory (RAM)), non-volatile (such as Read Only Memory (ROM), flash memory, etc.) or some combination of the two.

The communications unit 940 sends and receives data between the DM client 910 and other entities, such as a DM server, BCAST server, proxy response server, etc. For example, the communications unit 940 may receive out-of-band DM messages and may send response messages to the received out-of-band DM messages. The communications unit 940 may includes any number of transceivers, receivers, and transmitters of any number of types, such as wired, wireless, etc.

Exemplary embodiments of the present invention address the issue of regulating a response/status messages from a DM client to a DM server for out-of-band DM messages.

Certain aspects of the present invention may also be embodied as computer readable code on a non-transitory computer readable recording medium. A non-transitory computer readable recording medium is any data storage device that can store data, which can be thereafter read by a computer system. Examples of the non-transitory computer readable recording medium include ROM, RAM, Compact Disc (CD)-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a Device Management (DM) client of a device in a communication system, the method comprising:
receiving an out-of-band DM message from a DM server;
determining if out-of-band message response (OOBMsgResponse) reporting is inhibited based on an OOBMsgResponse node in a Management Object (MO); and
if it is determined that OOBMsgResponse reporting is not inhibited, sending a response message in response to the out-of-band DM message received from the DM server.

2. The method of claim 1, further comprising:
determining if the OOBMsgResponse node is present in the MO; and
if it is determined that the OOBMsgResponse node is not present in the MO, inhibiting a response message from being sent in response to the out-of-band DM message received from the DM server.

3. The method of claim 1, further comprising:
if it is determined that OOBMsgResponse reporting is inhibited, inhibiting a response message from being sent in response to the out-of-band DM message received from the DM server.

4. The method of claim 1, wherein the sending of the response message in response to the out-of-band DM message received from the DM server comprises:
determining an amount of time to wait before sending the response message based on a wait time node in the MO; and
sending the response message after the wait time elapses.

5. The method of claim 4, wherein the determining of the amount of time to wait before sending the response message comprises:
determining if the wait time node is present in the MO; and
if it is determined that the wait time node is not present in the MO, sending the response message without a delay.

6. The method of claim 1, wherein the location to which the response message is sent is based on one of a response Uniform Resource Locator (URL) node in the MO and a response Uniform Resource Identifier (URI) element in a SyncML message header (SyncHdr) of the out-of-band DM message.

7. The method of claim 6, further comprising:
determining if the response URL node is present in the MO; and
if it is determined that the response URL node is present in the MO, sending the response message to a location indicated by the response URL node.

8. The method of claim 7, further comprising:
if it is determined that the response URL node is not present in the MO; determining if the response URI element is present in the SyncHdr of the out-of-band DM message;
if it is determined that the response URI element is present in the SyncHdr of the out-of-band DM message, sending the response message to a location indicated by the response URI element node in the SyncHdr; and
if it is determined that the response URI element is not present in the SyncHdr of the out-of-band DM message, sending the response message to the DM server.

9. The method of claim 1, wherein the response message is sent to a response proxy server.

10. The method of claim 1, wherein the out-of-band DM message is received from the DM server via a BroadCAST (BCAST) server.

11. The method of claim 1, wherein the MO comprises a DM Account (DMAcc) MO.

12. The method of claim 1, wherein the MO does not comprise a DM Account (DMAcc) MO.

13. The method of claim 12, wherein at least one of the MO and the OOBMsgResponse node in the MO is referenced in the DMAcc MO.

14. A device for use in a communication system, the device comprising:
a memory for storing code of a Device Management (DM) client;
a processor for executing the code of the DM client stored in the memory;
a communications unit for receiving and sending messages for the DM client; and
the DM client for:
receiving an out-of-band DM message from a DM server;
determining if out-of-band message response (OOBMsgResponse) reporting is inhibited based on an OOBMsgResponse node in a Management Object (MO); and
if it is determined that OOBMsgResponse reporting is not inhibited, sending a response message in response to the out-of-band DM message received from the DM server.

15. The device of claim 14, wherein the DM client determines if the OOBMsgResponse node is present in the MO, and
if the DM client determines that the OOBMsgResponse node is not present in the MO, the DM client inhibits a response message from being sent in response to the out-of-band DM message received from the DM server.

16. The device of claim 14, wherein if the DM client determines that OOBMsgResponse reporting is inhibited, the DM client inhibits a response message from being sent in response to the out-of-band DM message received from the DM server.

17. The device of claim 14, wherein the DM client, when sending the response message in response to the out-of-band DM message received from the DM server, determines an amount of time to wait before sending the response message based on a wait time node in the MO, and sends the response message after the wait time elapses.

18. The device of claim 17, wherein the DM client, when determining the amount of time to wait before sending the response message determines if the wait time node is present in the MO, and if it is determined that the wait time node is not present in the MO, sends the response message without a delay.

19. The device of claim 14, wherein the location to which the DM client sends the response message is based on one of a response Uniform Resource Locator (URL) node in the MO and a response Uniform Resource Identifier (URI) element in a SyncML message header (SyncHdr) of the out-of-band DM message.

20. The device of claim 19, wherein the DM client determines if the response URL node is present in the MO, and if the DM client determines that the response URL node is present in the MO, sends the response message to a location indicated by the response URL node.

21. The device of claim 20, wherein if the DM client determines that the response URL node is not present in the MO, the DM client determines if the response URI element is present in the SyncHdr of the out-of-band DM message,
wherein, if the DM client determines that the response URI element is present in the SyncHdr of the out-of-band DM message, the DM client sends the response message to a location indicated by the response URI element node in the SyncHdr, and wherein, if the DM client determines that the response URI element is not present in the SyncHdr of the out-of-band DM message, the DM client sends the response message to the DM server.

22. The device of claim 14, wherein the DM client sends the response message to a response proxy server.

23. The device of claim 14, wherein the out-of-band DM message is received from the DM server via a BroadCAST (BCAST) server.

24. The device of claim 14, wherein the MO comprises a DM Account (DMAcc) MO.

25. The device of claim 14, wherein the MO does not comprise a DM Account (DMAcc) MO.

26. The device of claim 25, wherein at least one of the MO and the OOBMsgResponse node in the MO is referenced in the DMAcc MO.

27. A non-transitory computer readable recording medium having computer executable components, the computer readable recording medium comprising:
a Device Management (DM) structure that includes a plurality of DM Management Objects (MOs) associated with a DM protocol for DM of a device, the DM protocol for enabling a DM client associated with the device to receive an out-of-band DM message from a DM server and to send a response message to the out-of-band DM message based on at least one of the plurality of DM MOs,
wherein the at least one of the plurality of DM MOs comprises one or more nodes that control the response message to the out-of-band DM message.

28. The computer readable recording medium of claim 27, wherein the at least one of the plurality of DM MOs comprises a DM Account (DMAcc) MO.

29. The computer readable recording medium of claim 27, wherein the at least one of the plurality of DM MOs does not comprise a DM Account (DMAcc) MO.

30. The computer readable recording medium of claim 28, wherein the at least one of the plurality of DM MOs or at least one or more nodes, is referenced in the DMAcc MO.

31. The computer readable recording medium of claim 27, wherein the one or more nodes comprise an Out-Of-Band Message Response (OOBMsgResponse) node.

32. The computer readable recording medium of claim 31, wherein the OOBMsgResponse node comprises the properties:

| Status | Occurrence | Format | Minimum Access Types |
|---|---|---|---|
| Optional | ZeroOrOne | node | Get. |

33. The computer readable recording medium of claim 27, wherein the one or more nodes comprise an Out-Of-Band Message Response Inhibit (OOBMsgResponseInhibit) node that indicates whether the response message to the out-of-band DM message is one of inhibited and allowed.

34. The computer readable recording medium of claim 33, wherein the OOBMsgResponse node comprises the properties:

| Status | Occurrence | Format | Minimum Access Types |
|---|---|---|---|
| Required | One | boolean | Get, Replace. |

35. The computer readable recording medium of claim 33, wherein the one or more nodes comprise an Out-Of-Band Message Response (OOBMsgResponse) node that is a parent node to the OOBMsgResponseInhibit node.

36. The computer readable recording medium of claim 27, wherein the one or more nodes comprise an Out-Of-Band Message Response Wait Time (OOBMsgResponseWaitTime) node that indicates a minimum amount of time that the DM Client waits before sending the response message to the out-of-band DM message.

37. The computer readable recording medium of claim 36, wherein the OOBMsgResponse node comprises the properties:

| Status | Occurrence | Format | Minimum Access Types |
|---|---|---|---|
| Optional | ZeroOrOne | int | Get, Replace. |

38. The computer readable recording medium of claim 36, wherein the one or more nodes comprise an Out-Of-Band Message Response (OOBMsgResponse) node that is a parent node to the OOBMsgResponseWaitTime node.

39. The computer readable recording medium of claim 27, wherein the one or more nodes comprise an Out-Of-Band Message Response Uniform Resource Locator (URL) (OOBMsgResponseRespURL) node that indicates a URL of a response proxy server to send the response message to the out-of-band DM message.

40. The computer readable recording medium of claim 39, wherein the OOBMsgResponse node comprises the properties:

| Status | Occurrence | Format | Minimum Access Types |
|---|---|---|---|
| Optional | ZeroOrOne | chr | Get, Replace. |

41. The computer readable recording medium of claim 39, wherein the one or more nodes comprise an Out-Of-Band Message Response (OOBMsgResponse) node that is a parent node to the OOBMsgResponseRespURL node.

42. A Device Management (DM) system for controlling responses to an out-of-band DM message, the system comprising:
a DM server for sending an out-of-band DM message to a plurality of DM clients; and
a plurality of response proxy servers, each for receiving a corresponding response message to the out-of-band DM message from a corresponding one of the plurality of DM clients.

43. The system of claim 42, further comprising a BroadCAST (BCAST) server, wherein the out-of-band DM message is sent by the DM server to the plurality of DM clients through a BroadCAST (BCAST) server.

44. The system of claim 42, wherein the plurality of response proxy servers are logical response proxy servers.

45. The system of claim 42, wherein a number of the plurality of response proxy servers is the same as a number of the plurality of DM clients.

46. The system of claim 42, wherein the plurality of response proxy servers provide aggregated response data to the DM server, the aggregated response data corresponding to all of the response messages to the out-of-band DM message from the plurality of DM clients.

47. The system of claim 42, further comprising a DM-Response (DM-Resp) interface, through which, the plurality of response proxy servers communicate with the DM server.

48. The system of claim 47, wherein the DM-Response (DM-Resp) interface is realized through a DM Management Object (MO).

49. The system of claim 42, further comprising a DM-2 interface, through which at least one of the DM server and the plurality of response proxy servers communicate with the plurality of DM clients.

50. The system of claim 42, further comprising a DM application for triggering the sending of the out-of-band message by the DM server.

51. The system of claim 42, further comprising the plurality of DM clients, each of the plurality of DM clients for receiving the out-of-band DM message and for sending the response message to the out-of-band DM message to the corresponding response proxy server.

* * * * *